(12) United States Patent
Nemoto et al.

(10) Patent No.: US 7,352,271 B2
(45) Date of Patent: Apr. 1, 2008

(54) PROBE AND CONTOUR MEASURING INSTRUMENT

(75) Inventors: Kentaro Nemoto, Kawasaki (JP); Takeshi Yamamoto, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/798,457

(22) Filed: May 14, 2007

(65) Prior Publication Data
US 2007/0266582 A1    Nov. 22, 2007

(30) Foreign Application Priority Data
May 16, 2006    (JP)    ............................. 2006-136878

(51) Int. Cl.
*H01L 31/08*    (2006.01)
(52) U.S. Cl. .............................. 338/16; 338/47; 73/81; 33/505
(58) Field of Classification Search .................... 338/2, 338/16, 28, 47; 33/505, 561, 558–559; 73/81–83, 73/104–105
See application file for complete search history.

(56) References Cited

U.S. PATENT DOCUMENTS

| 4,656,454 A | * | 4/1987 | Rosenberger | ................... 338/2 |
| 4,809,552 A | * | 3/1989 | Johnson | ................... 73/514.33 |
| 5,414,940 A | * | 5/1995 | Sturdevant | ................... 33/559 |
| 6,331,768 B1 | * | 12/2001 | Drori et al. | ................... 323/369 |
| 6,675,637 B2 | * | 1/2004 | Saito | ........................... 73/104 |
| 7,039,550 B2 | * | 5/2006 | Noda | ......................... 702/168 |

FOREIGN PATENT DOCUMENTS

| JP | A 03-115909 | 5/1991 |
| JP | A 10-100006 | 4/1998 |
| JP | A 10-217004 | 8/1998 |
| JP | A 2003-202221 | 7/2003 |
| JP | A 2004-061322 | 2/2004 |

* cited by examiner

*Primary Examiner*—K. Richard Lee
(74) *Attorney, Agent, or Firm*—Oliff & Berridge, PLC

(57) ABSTRACT

A probe body (200) includes a middle closing portion (250) formed upright on a connector front portion (261A) and a female thread (261D) into which a male screw (110) is screwed. A sensor module (300) includes a slidable-contact portion (322) that slidably contacts with the connector front portion (261A), a pressing member (321) that is pressed against the middle closing portion (250) and an insertion hole (325). The insertion hole (325) has a widened portion (325B) that is inclined in such a manner that a distance between an opening on the pressing portion (321) side, the opening positioned on a screw-hole-forming-portion end surface (324), and the pressing portion (321) gradually becomes larger toward the slidable-contact portion (322) side. The insertion hole (325) has a diameter larger than that of the male screw (110).

11 Claims, 13 Drawing Sheets

PROBE AND CONTOUR MEASURING INSTRUMENT

BACKGROUND OF THE INVENTION

1. Field of the Invention

The present invention relates to a probe and a contour measuring instrument. For example, the present invention relates to a contour measuring instrument and a probe used when a contour such as a profile and roughness of a surface of a workpiece is measured using a vibrating sensor.

2. Description of Related Art

There have been known contour measuring instruments that measure a contour such as a profile and roughness of a surface of a workpiece by scanning the surface of the workpiece, the contour measuring instruments including a roughness measuring Instrument, a profile measuring instrument, a roundness measuring instrument and a coordinate measuring instrument.

In such measuring instruments, a vibrating force sensor (hereinafter, abbreviated as a force sensor) 1 as shown in FIG. 10 has been used as a sensor for detecting a surface of a workpiece based on a minute displacement of the contact portion contacting with the surface of the workpiece.

The force sensor 1 shown in FIG. 16 includes a metal base 2, a stylus 3 integrally formed on the base 2, a vibrating element 4 that vibrates (in an axial direction) the stylus 3 and a detecting element 5 that detects a vibration state of the stylus 3 and outputs the vibration state as a detection signal. A contact pin (contact portion) 6 formed of a diamond chip, ruby and the like is fixedly bonded to a tip end of the stylus 3. The vibrating element 4 and the detecting element 5 are formed by a single piece of piezoelectric element, the piezoelectric element fixedly bonded on each of front and back surfaces of the base 2.

As shown in FIG. 11, when a vibration signal Pi (voltage signal) having predetermined frequency and amplitude is applied to the vibrating element 4 of the force sensor 1, the detecting element 5 obtains a detection signal Qo (voltage signal) having predetermined frequency and amplitude.

FIG. 12 shows variation in the amplitude of the detection signal Qo caused by contact with a workpiece W. In a state where the stylus 3 is not in contact with the workpiece W, when the vibration signal Pi having a certain amplitude at a resonance frequency of the stylus 3 is applied to the vibrating element 4, the stylus 3 resonates to provide the detection signal Qo having an amplitude Ao to the detecting element 5. When the stylus 3 comes into contact with the workpiece W, the amplitude of the detection signal Qo attenuates from Ao to Ax.

A relationship between an attenuation rate k (Ax/Ao) and a measuring force is shown in FIG. 13.

Here, description will be given by taking an example of a condition where the detection signal Qo in a contact state of the stylus 3 (force sensor 1) and the workpiece W is attenuated to 90% of a non-contact state (i.e., attenuation rate k=0.9). As seen from the relationship in FIG. 13, the measuring force in the contact state is 135 [µN].

Accordingly, by controlling with an actuator or the like a distance between the force sensor 1 and the workpiece W such that the attenuation rate k is always constant when the force sensor 1 contacts with the workpiece W, a profile and roughness of the workpiece W can be measured with a constant measuring force.

In the contour measuring instrument having the sensor 1 as described above, when the stylus is broken or malfunctioned and unable to make a proper performance, the force sensor 1 needs to be replaced with a new one that can perform properly. In such a case, it is possible to replace a whole unit of the force sensor 1.

However, in the replacement of the whole unit of the force sensor 1, positioning is difficult. When a position after the replacement of the contact pin 6 of the force sensor 1 is displaced from that before the replacement, measuring accuracy might be greatly affected.

With such a background, there has been a demand for an arrangement that can highly reproducibly position the force sensor to the probe.

As an arrangement for positioning a plurality of components with a high reproducibility, a so-called pin-lock method has been known (see, for instance, Document 1: JP-A-10-217004 and Document 2: JP-A-10-J00006).

In the arrangement disclosed in Document 1, an eccentric pin eccentric to the axial core of a crank pin is inserted in a tip attachment hole.

By rotating the crank pin to bring the tip into contact with a lateral wall surface, the crank pin is locked.

In the arrangement disclosed in Document 2, an insert seating section on which an insert is mounted is provided at a tip end of a holder, the insert seating portion provided with a dented pocket that extends through the insert seating section. A root of a pin of a pin member has a tapered surface, and a central hole of the insert is provided with a curved convex surface at a position engaging with the pin.

By fixedly fitting the pin member in the pocket by a fixing bolt and by pressing a hole wall of the central hole of the insert by the pin, the insert is locked on the insert seating portion.

However, in the arrangement of Document 1, since the tip is brought into contact only with the lateral wall surface by the eccentric pin, the tip might be displaced in the axial direction of the eccentric pin.

In the arrangement of Document 2, two components (i.e., the fixing bolt and the pin member) are required for locking the insert, which complicates the arrangement and degrades working efficiency of the locking.

SUMMARY OF THE INVENTION

An object of the present invention is to provide a probe and a contour measuring instrument that are capable of positioning a force sensor easily and highly reproducibly with a simple arrangement.

A probe according to an aspect of the present invention includes: a force sensor that detects a measuring force generated when the probe contacts with a workpiece and outputs the measuring force as a force detection signal; a position detector that detects a measuring position of the workpiece detected by the force sensor and outputs the measuring position as measuring position information; a relative moving section that relatively moves the force sensor and the workpiece; a probe body that is held by the relative moving section; a sensor module to which the force sensor is attached; and a fixing member that is inserted to the sensor module and the probe body, the fixing member detachably positioning and fixing the sensor module to the probe body, in which the probe body includes a substantially planar first positioning portion, a second positioning portion that is formed upright on the first positioning portion and an engaging hole that is provided to the first positioning portion, the engaging hole allowing the fixing member to be inserted thereinto and engaged therewith in a detachable manner, the sensor module includes a slidable-contact portion that slidably contacts with the first positioning portion, a pressing portion that is pressed against the second positioning portion and an insertion hole that communicates a slidable-contact portion side and a side opposite to the slidable-contact portion side, the insertion hole allowing the fixing member inserted thereinto, the fixing member includes: a rod-like portion that is formed in a rod-like shape and inserted into the insertion hole, an end side of the rod-like portion engaged with the engaging hole; and a fixing projection that protrudes from a lateral surface of the other end side of the rod-like portion, and the insertion hole includes an inclined portion on which the fixing projection can abut, the inclined portion inclined such that a distance between a pressing portion side of an opening positioned opposite to the slidable-contact portion and the pressing portion becomes gradually larger toward the slid-contacting portion, the insertion hole having a diameter larger than that of the rod-like portion.

According to the aspect of the present invention, the fixing member includes the rod-like portion and the fixing projection. The probe body held by the relative moving section includes the first positioning portion, the second positioning portion formed upright on the first positioning portion and the engaging hole that is formed in the first positioning portion. The sensor module to which the force sensor is attached includes the slidable-contact portion that slidably contacts with the first positioning portion is slidably contact, a pressing portion that is pressed against the second positioning portion and the insertion hole that communicates the slidable-contact portion side and the side opposite to the slidable-contact portion. The insertion hole has an inclined portion that inclines in such a manner that the distance between the pressing portion side of the opening and the pressing portion becomes gradually larger toward the slidable-contact portion, the opening positioned on the side opposite to the slidable-contact portion. The insertion hole has a diameter larger than the thickness of the rod-like portion.

With the arrangement, positioning and fixing of the sensor module to the probe body can be performed as follows.

Specifically, the sensor module is positioned such that the slidable-contact portion faces the first positioning portion and the pressing portion faces the second positioning portion. By inserting the fixing member into the insertion hole with the fixing projection slidably contacting with the inclined portion of the insertion hole, the rod-like portion is engaged with the engaging hole of the probe body, thereby positioning and fixing the sensor module to the probe body.

In this step, when the fixing projection is moved in a direction intersecting with an inclining direction of the inclined portion while being continuously or intermittently contacted with the inclined portion, the second positioning portion can be pressed against the pressing portion with the sensor module slidably contacting with the first positioning portion. Accordingly, the sensor module can be positioned easily and highly reproducibly in a planar direction of the first positioning portion.

In addition, the rod-like portion can be engaged with the engaging hole with the inclined portion pressed by the fixing projection in a direction toward the first positioning portion. With the arrangement, the sensor module can be positioned highly reproducibly in a direction substantially orthogonal to the planar direction of the first positioning portion.

Since only the fixing member is required for positioning the sensor module to the probe body, the arrangement can be simplified and work efficiency of the positioning can be enhanced.

Therefore, the force sensor can be positioned highly reproducibly with a simple arrangement.

In the probe according to an aspect of the present invention, the force sensor preferably includes a stylus having a contact portion on a tip end thereof, a vibrating element that vibrates the stylus and a detecting element that detects a vibration state of the stylus and outputs the vibration state as a detection signal.

According to the aspect of the present invention, the force sensor includes the stylus, the vibrating element and the detecting element.

Accordingly, positioning of a so-called vibrating force sensor, which can perform highly accurate measurement with a small measuring force, can be realized highly reproducibly with a simple arrangement, thus providing a probe capable of performing measurement with even higher accuracy.

In the probe according to an aspect of the present invention, it is preferable that the engaging hole is a female thread and the rod-like portion is a male screw.

According to the aspect of the present invention, the female thread is employed as the engaging hole and the male screw is employed as the rod-like portion.

Accordingly, with a simple arrangement in which the rod-like portion is screwed into the engaging hole, the sensor module can be positioned and fixed to the probe body, thereby realizing the positioning of the force sensor easily.

In the probe according to an aspect of the present invention, the fixing projection is preferably continuously provided along a circumferential direction of the rod-like portion.

According to the aspect of the present invention, the fixing projection is continuously provided along the circumferential direction of the rod-like portion.

With the arrangement, when the fixing member is inserted into the sensor module, the fixing projection can constantly abut on the inclined portion without necessity of carefully choosing the position of the fixing projection, thereby realizing the positioning of the force sensor even more easily.

Especially, by employing the male screw as the rod-like portion and the female thread as the engaging hole, the rod-like portion can be screwed into the engaging hole with the fixing projection constantly abutting on the inclined portion, thereby realizing the positioning of the force sensor even more easily.

In the probe according to an aspect of the present invention, it is preferable that the insertion hole is formed such that a distance between an end on the slidable-contact portion side of the inclined portion and the pressing portion is substantially equal to a distance between an end on the second positioning portion side of the engaging hole and the second engagement portion.

According to the aspect of the present invention, the insertion hole is formed such that the distance between the end on the slidable-contact portion side of the inclined portion and the pressing portion is substantially equal to the distance between the end on the second positioning portion side of the engaging hole and the second positioning portion.

With the arrangement, when the second positioning portion is pressed against the pressing portion, the end on the slidable-contact portion side of the inclined portion and the end on the second positioning portion side of the engaging hole can be positioned collinearly with each other. Accordingly, the rod-like portion can be engaged with the engaging hole with the rod-portion substantially abutting on the end on the slid-contacting portion side of the inclined portion. The arrangement allows the fixing projection to abut on the inclined portion with the minimized projecting amount of the fixing projection from the lateral surface, which contributes to weight reduction of the fixing member and realizes measurement with higher accuracy.

In the probe according to an aspect of the present invention, it is preferable that the probe body includes a body-connecting section that is provided on the first positioning portion and electrically coupled to a controlling section for controlling the relative moving section, and the sensor module includes a module-connecting portion that is provided at a position abuttable on the body-connecting portion in the slidable-contact portion side, the module-connecting portion electrically coupled to the force sensor and also electrically coupled to the body-connecting portion when the module-connecting portion abuts on the body-connecting portion.

According to the aspect to the present invention, the probe body includes the body-connecting portion that is provided on the first positioning portion and electrically coupled to a controlling section. The sensor module includes the module-connecting portion that is provided on the slidable-contact portion side, the module-connecting portion being abuttable on the body-connecting portion and electrically coupled to the force sensor.

With the arrangement, by bringing the body-connecting portion and the module-connecting portion into contact with each other when the sensor module is positioned to the probe body, the controlling section and the force sensor can be connected in a signal-communicable manner.

Accordingly, replacement of the sensor module can be performed more easily.

In the probe according to an aspect of the present invention, it is preferable that the body-connecting portion includes an advancement/retraction abutting portion that is advanceable/retractable in a direction intersecting with the first positioning portion, the module-connecting portion abutting on the advancement/retraction abutting portion.

According to the aspect of the present invention, the body-connecting portion includes an advancement/retraction abutting portion that is advanceable and retractable in the direction intersecting with the first positioning portion.

With the arrangement, the body-connecting portion and the module-connecting portion can abut on each other with a substantially uniform force regardless of shapes of abutment portions of the connecting portions. Accordingly, the body-connecting portion and the module-connecting portion do not have to be precisely designed or produced, so that productivity can be enhanced.

In the probe according to an aspect of the present invention, it is preferable that a portion adapted to abut on the module-connecting portion in the body-connecting portion is formed in a sphere.

According to the aspect of the present invention, the portion of the body-connecting portion on which the module-connecting portion abuts is formed in a sphere.

With the arrangement, the body-connecting portion can point-contact with the module-connecting portion, which can reduce friction resistance in moving the sensor module toward the second positioning portion while slidably contacting with the first positioning portion.

Accordingly, the positioning of the force sensor can be performed even more easily.

In the probe according to an aspect of the present invention, it is preferable that the sensor module includes a storage section that is electrically coupled to the module-connecting portion and adapted to readably store specific property information about a property specific to the force sensor.

According to the aspect of the present invention, the sensor module includes the storage section that is electrically coupled to the module-connecting portion and adapted to readably store the specific property information about a property specific to the force sensor.

With the arrangement, when the sensor module is positioned and fixed to the probe body, the controlling section reads and recognizes the specific property information stored in the storage section, so that the controlling section can control the relative moving section in accordance with the force sensor.

Accordingly, adjustments of properties specific to of the force sensor such as gain adjustment and frequency adjustment can be facilitated, thereby easily expanding the use.

A contour measuring instrument according to another aspect of the present invention includes: the probe according to the above aspect; and a controlling section that drives the relative moving mechanism to bring the contact portion on a tip end of the probe into contact with the workpiece in such a manner that the detection signal from the force sensor is equal to a preset value and reads the measuring position information from the position detector to measure a contour of the workpiece from the measuring position information.

A contour measuring instrument according to still another aspect of the present invention includes: the probe according to the above aspect; and a controlling section that reads the specific property information from the storage section, drives the relative moving mechanism under a control corresponding to the property specific to the force sensor to bring the contact portion of the probe into contact with the surface of the workpiece in such a manner that the detection signal from the force sensor is equal to a preset value and reads the measuring position information from the position detector to measure a contour of the workpiece from the measuring position information.

According to these aspects of the present invention, the contour measuring instrument having advantages similar to those of the above-described probe can be provided.

DETAILED DESCRIPTION OF PREFERRED EMBODIMENT(S)

An embodiment of the present invention will be described with reference to the attached drawings.

[Arrangement of Contact-Type Scanning Probe System]

First, a contact-type scanning probe system as a contour measuring instrument according to the embodiment of the present invention will be described.

Figure 1:
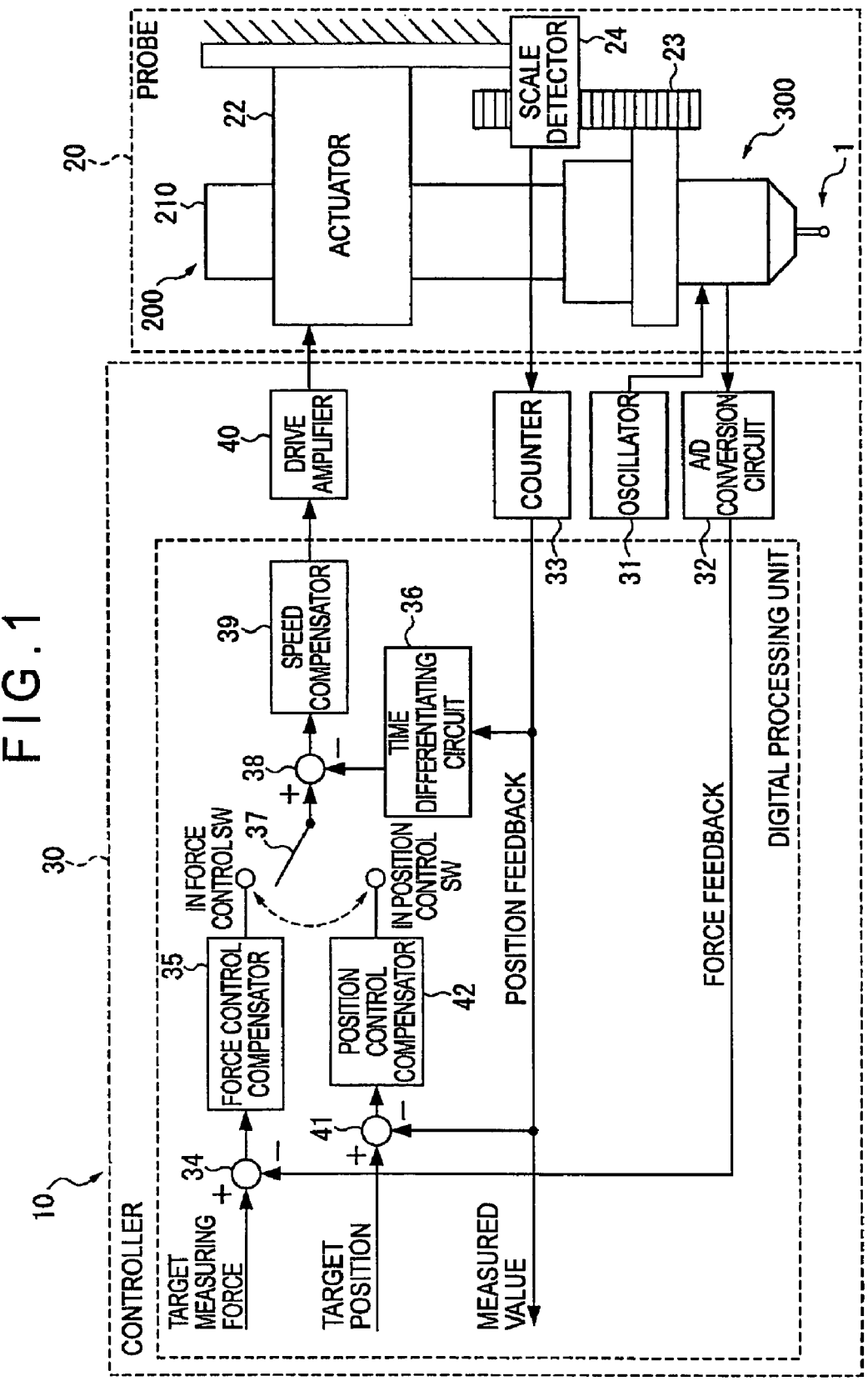
FIG. 1 is a schematic illustration showing an outline of a contact-type scanning probe system according to an embodiment of the present invention.
Figure 2:
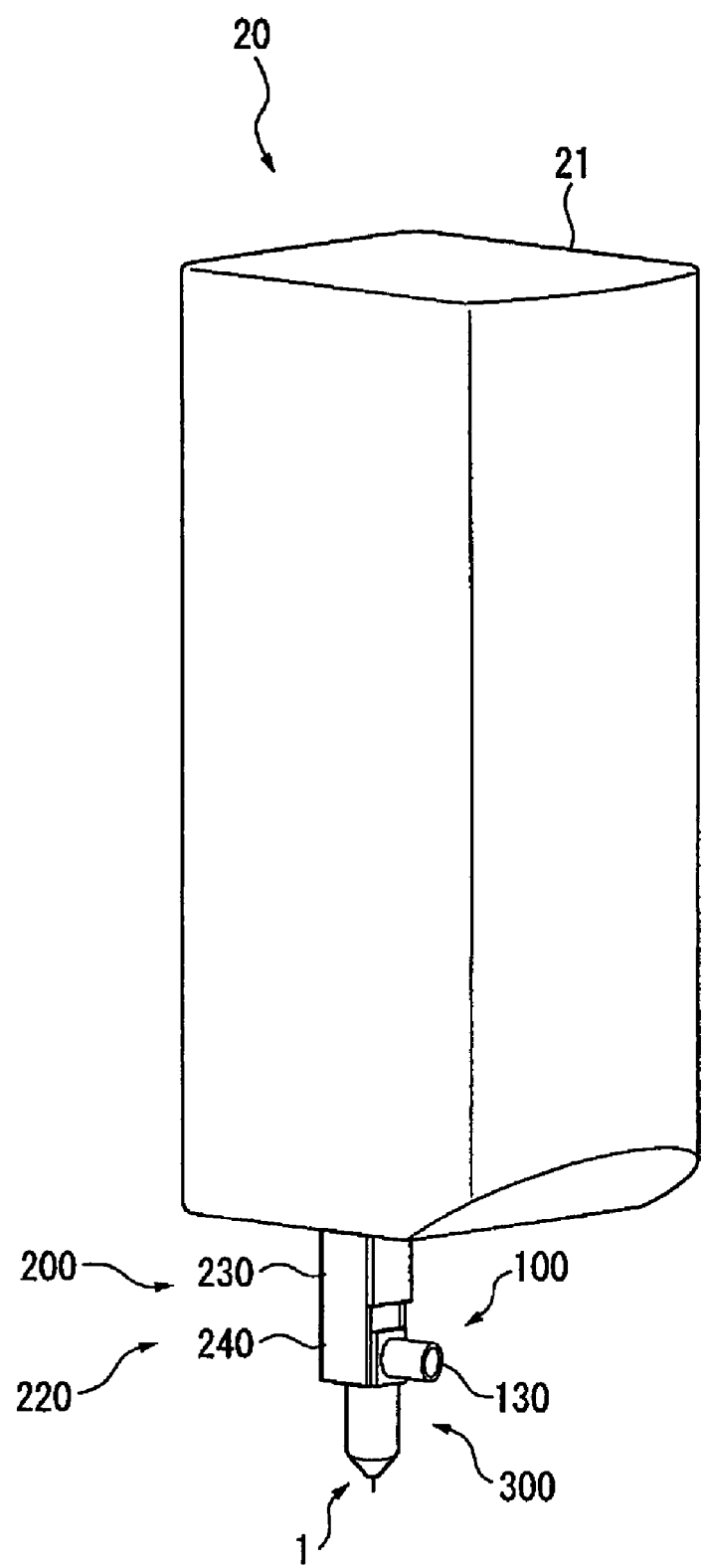
FIG. 2 is a perspective view showing an arrangement of a probe of the embodiment.
Figure 3:
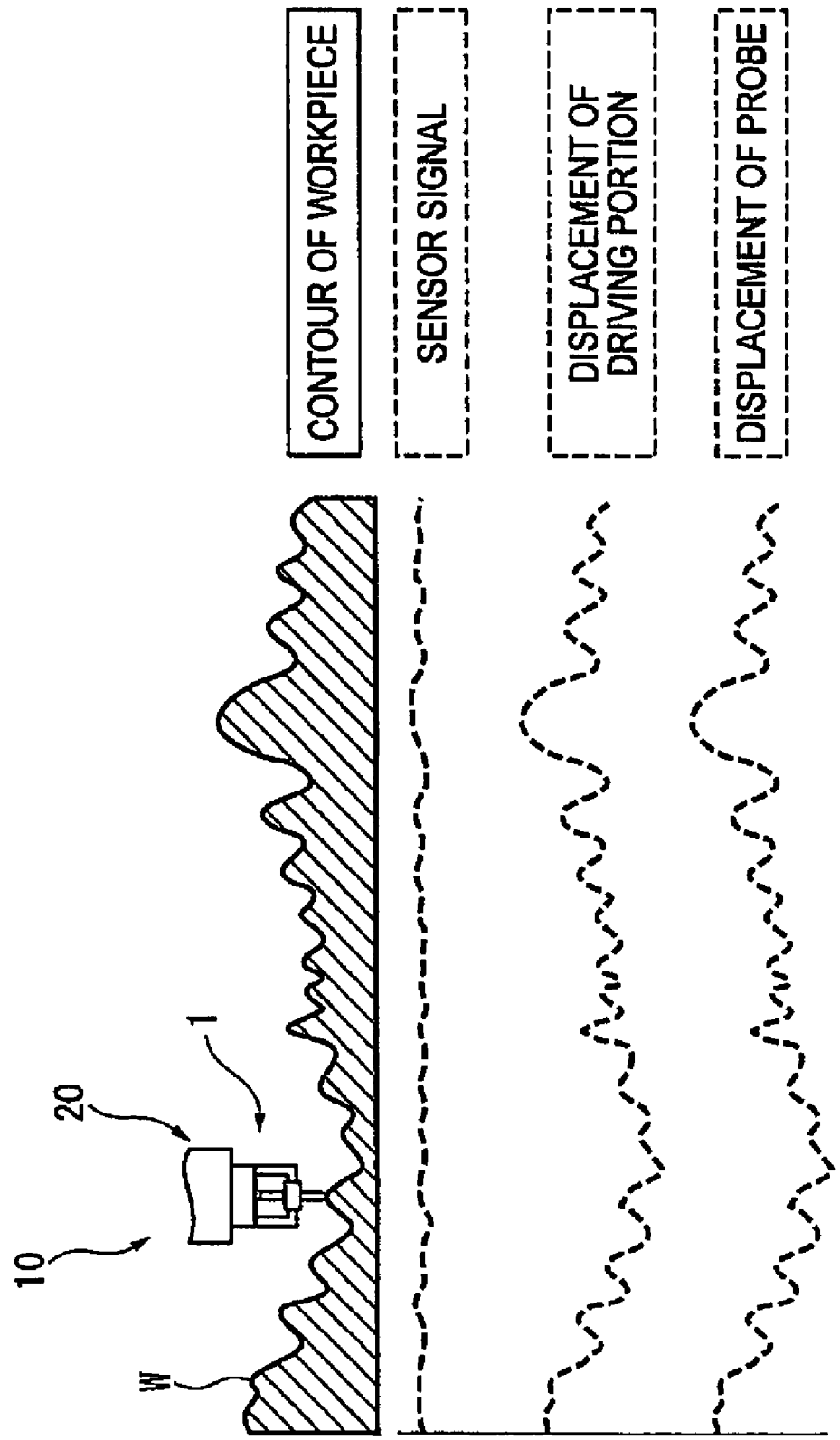
FIG. 3 is a conceptual diagram showing how the workpiece is scanned according to the embodiment.
Figure 4:
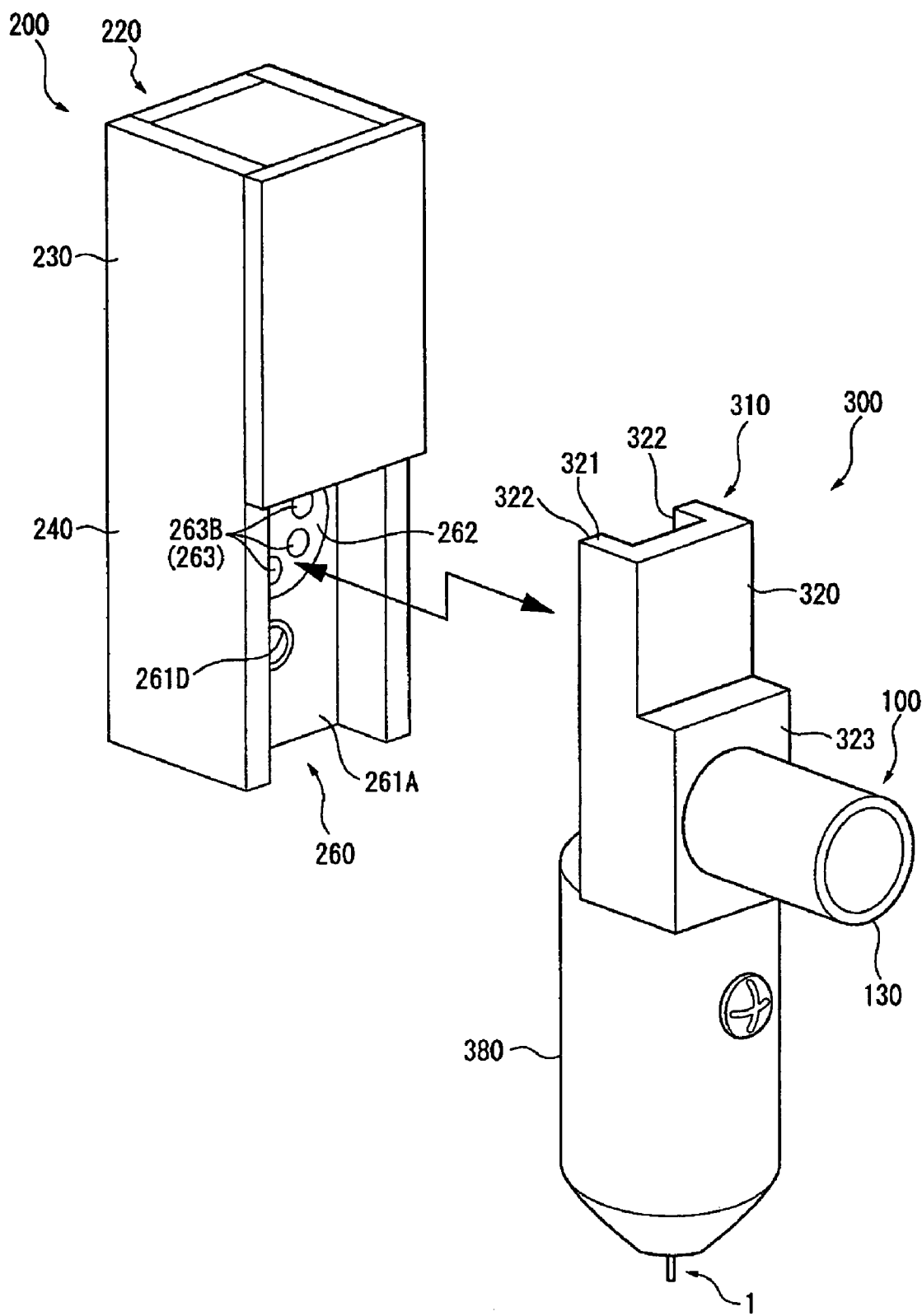
FIG. 4 is a perspective view showing arrangements of a body fixing portion and a sensor module of the embodiment.
Figure 5:
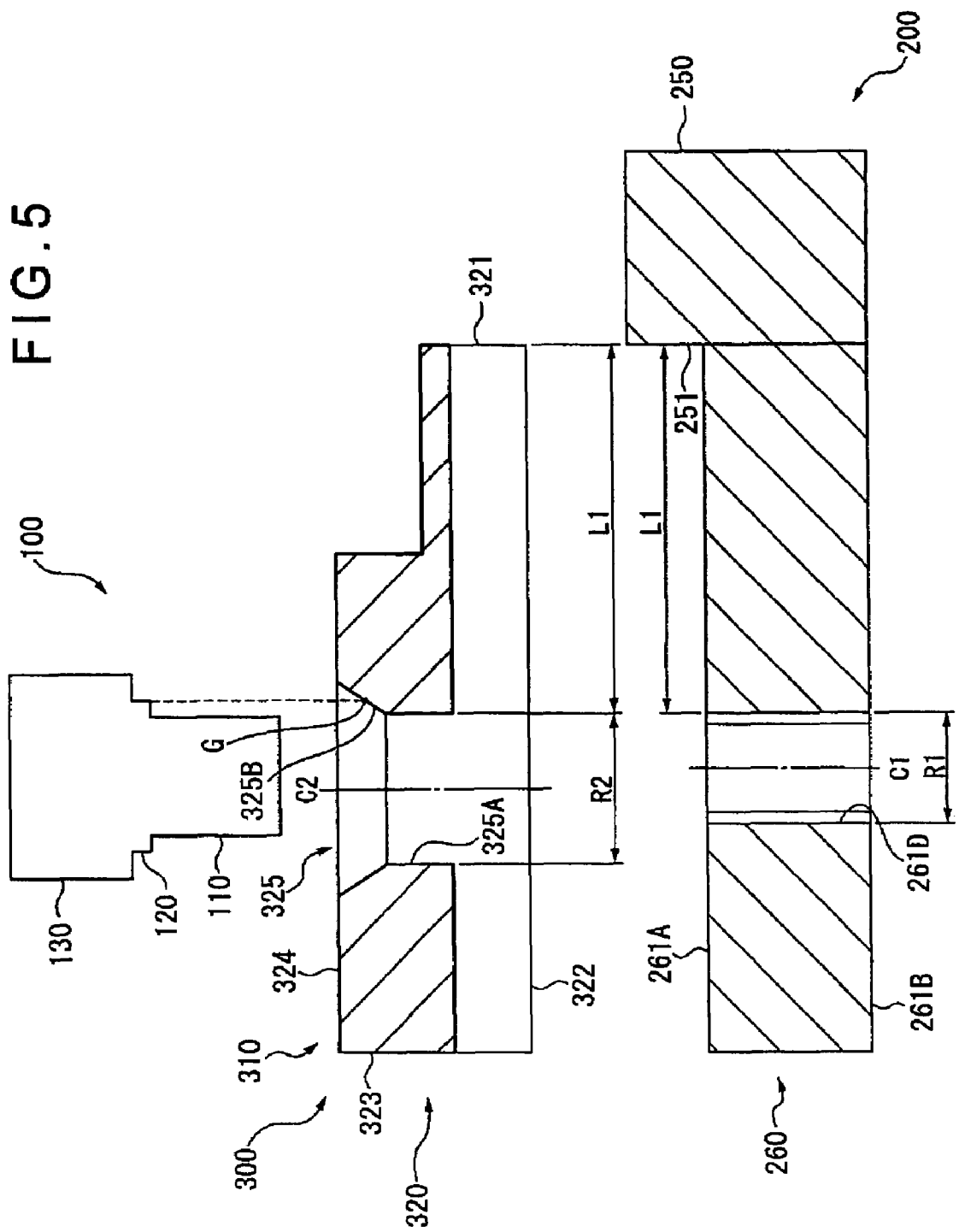
FIG. 5 is a cross section showing outlines of primary parts of the body fixing portion and the sensor module of the embodiment.
Figure 6:
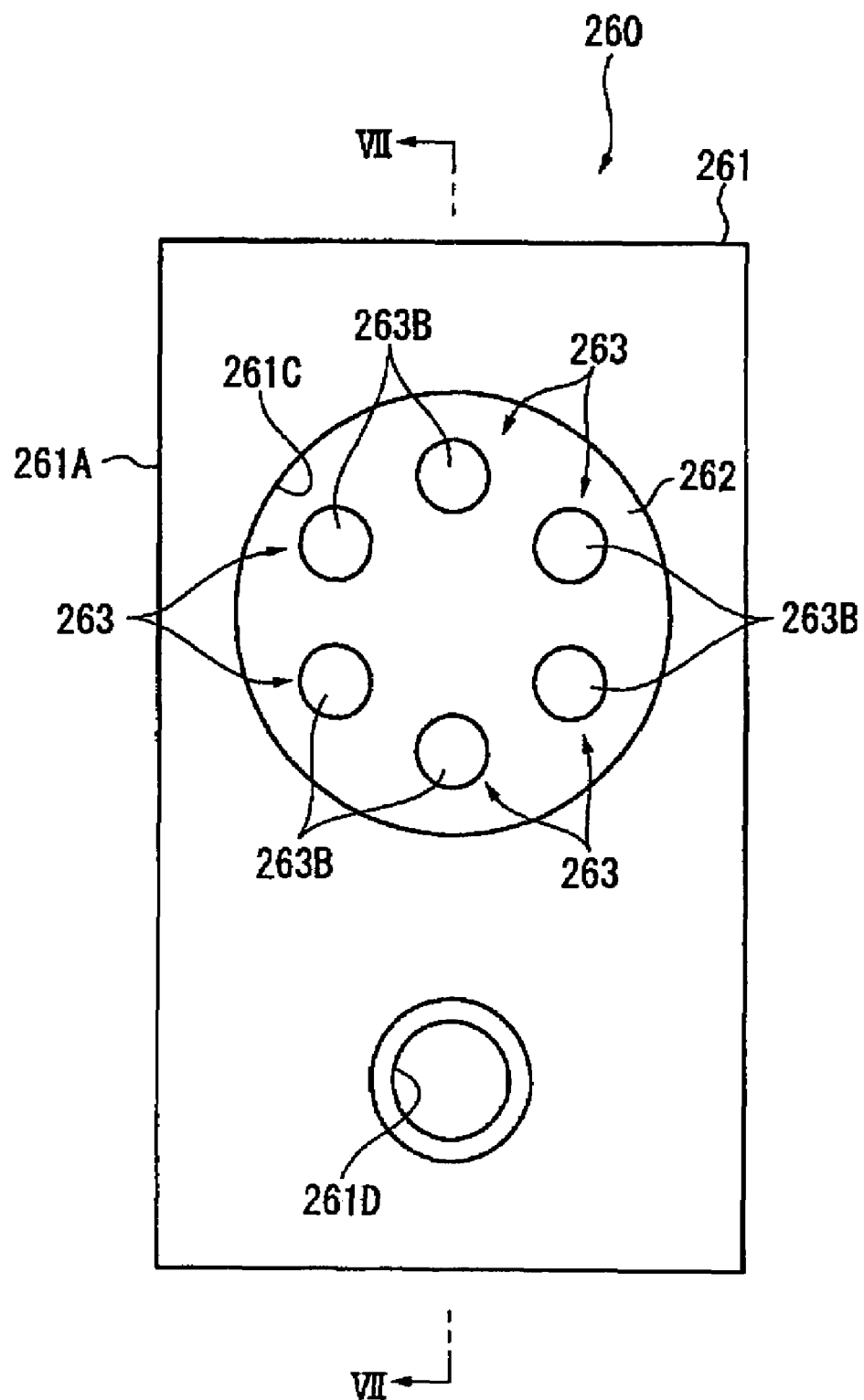
FIG. 6 is a front view showing an arrangement of a body connector of the embodiment.
Figure 7:
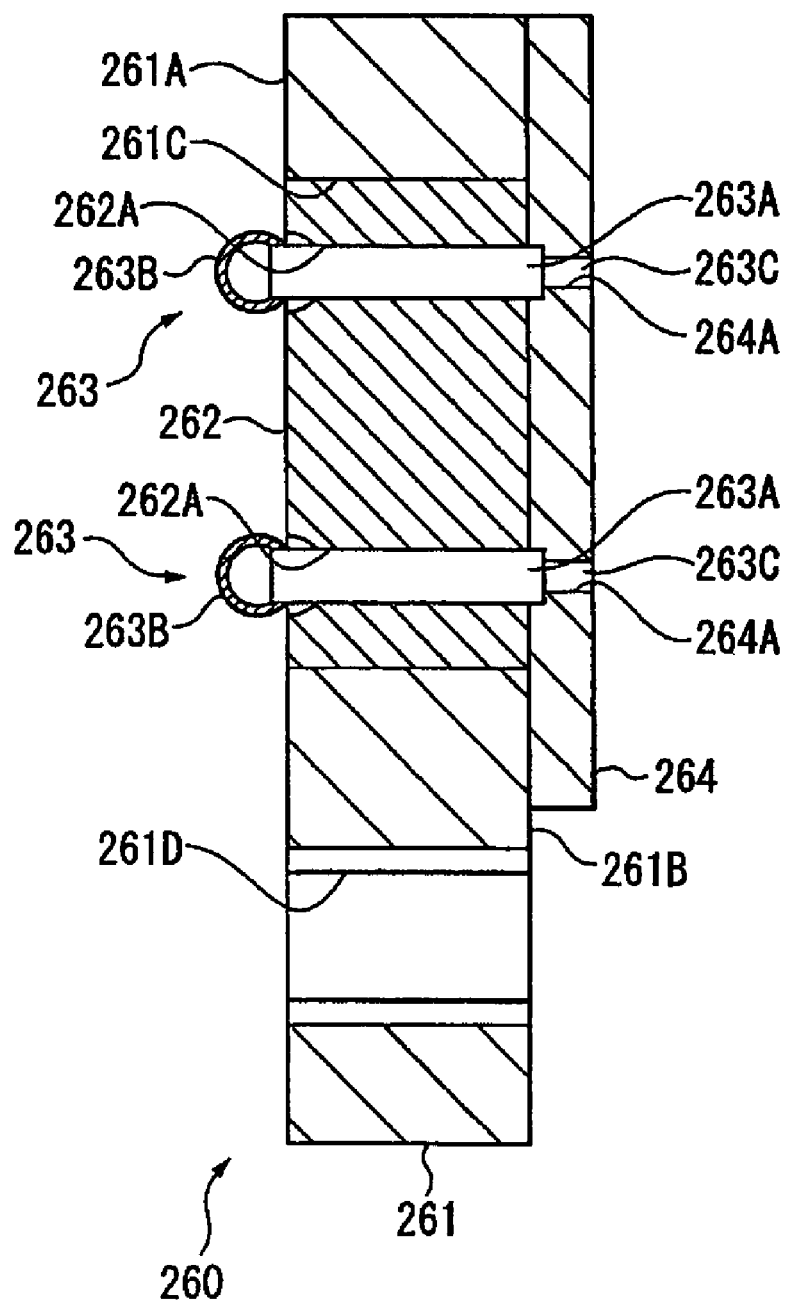
FIG. 7 is a cross section taken along the line VII-VII in FIG. 6 according to the embodiment.
Figure 8:
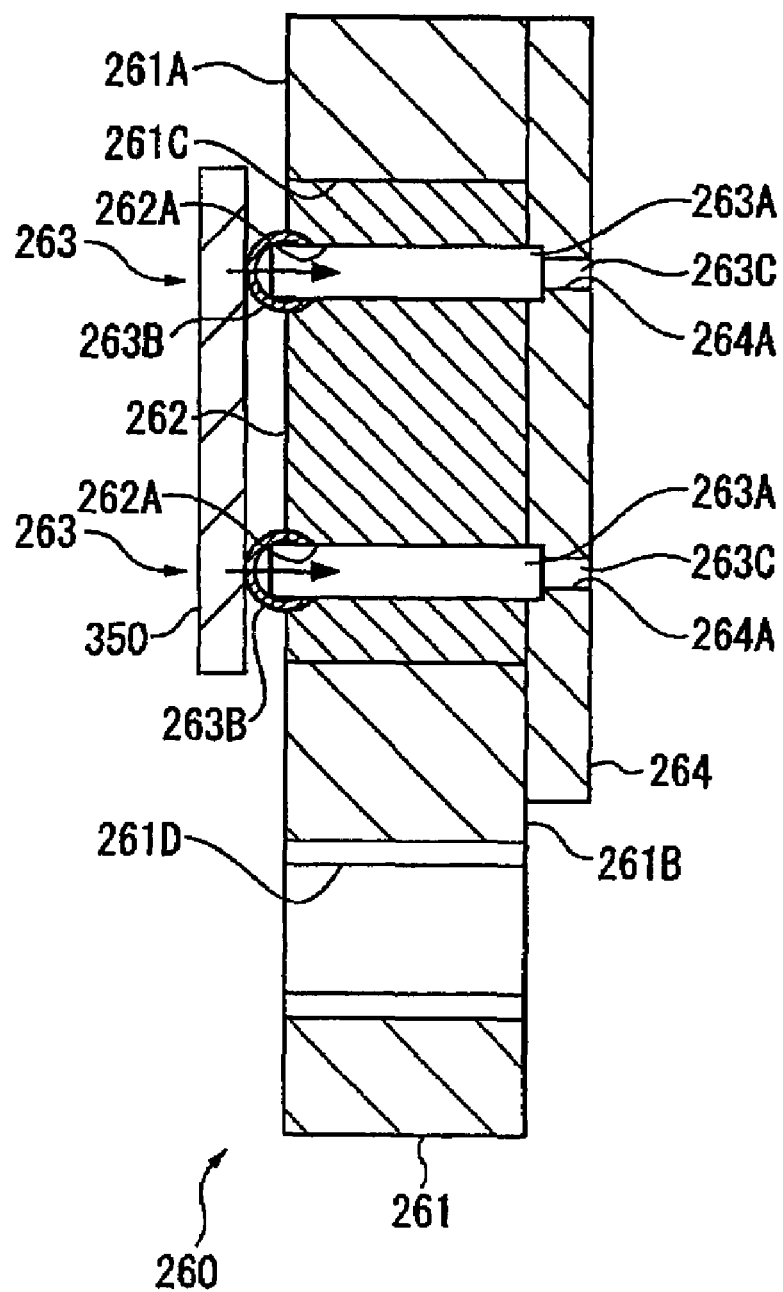
FIG. 8 is a cross section showing how a body-side substrate and a connector-side substrate are electrically coupled to each other according to the embodiment.
Figure 9:
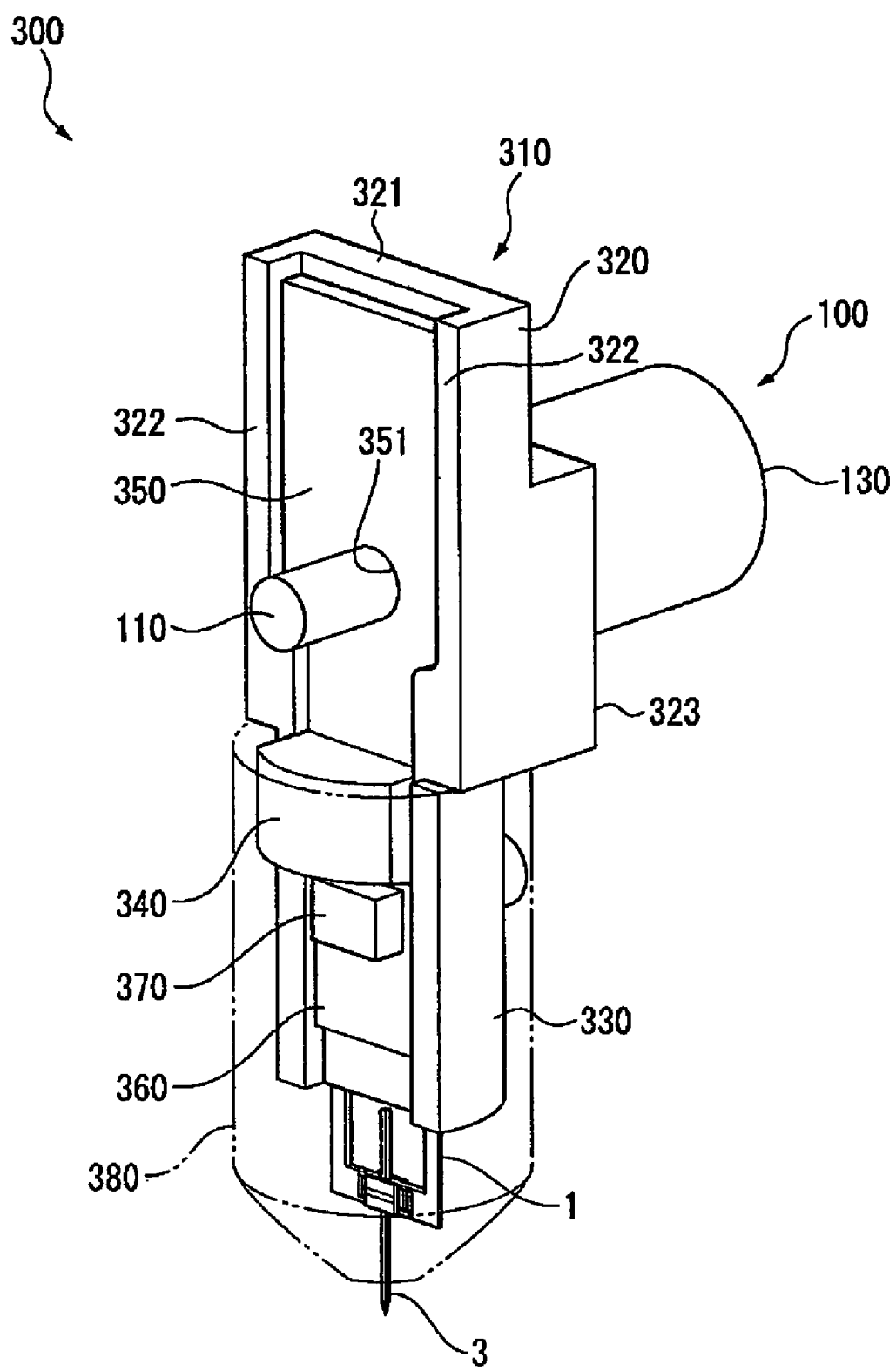
FIG. 9 is a rear perspective view showing the arrangement of the sensor module of the embodiment.
Figure 10:
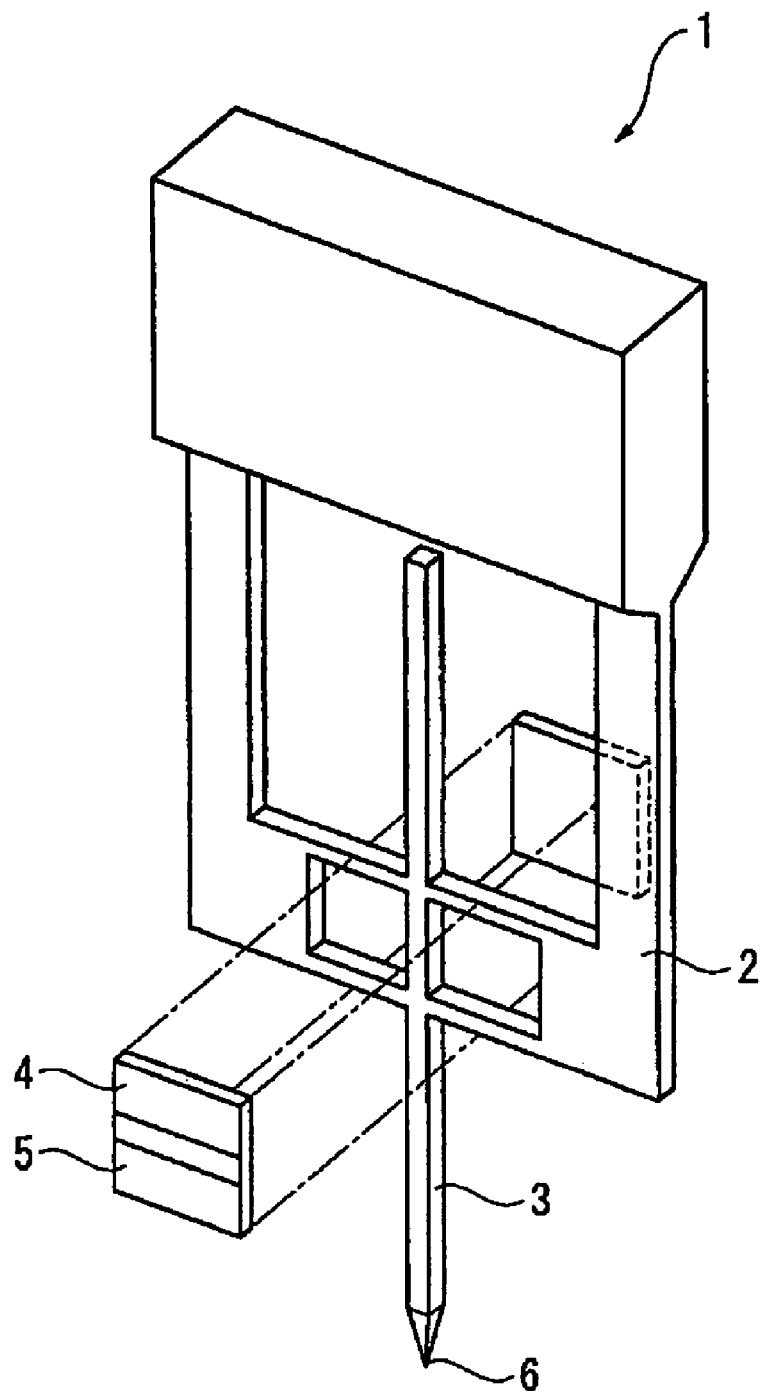
FIG. 10 is an exploded perspective view showing an arrangement of a force sensor.
Figure 11:
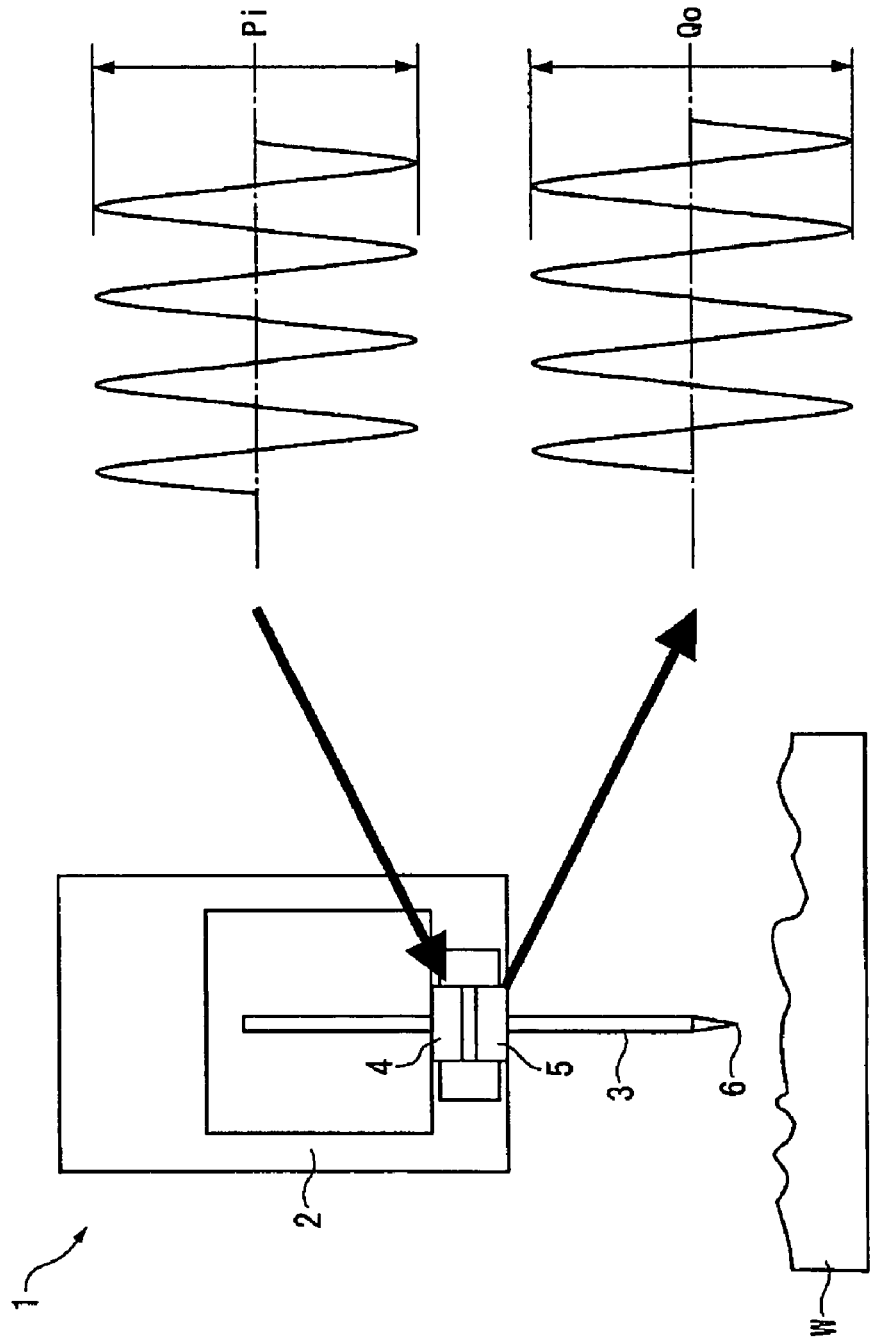
FIG. 11 is a chart showing a vibration signal and a detection signal that are applied to the force sensor.
Figure 12:
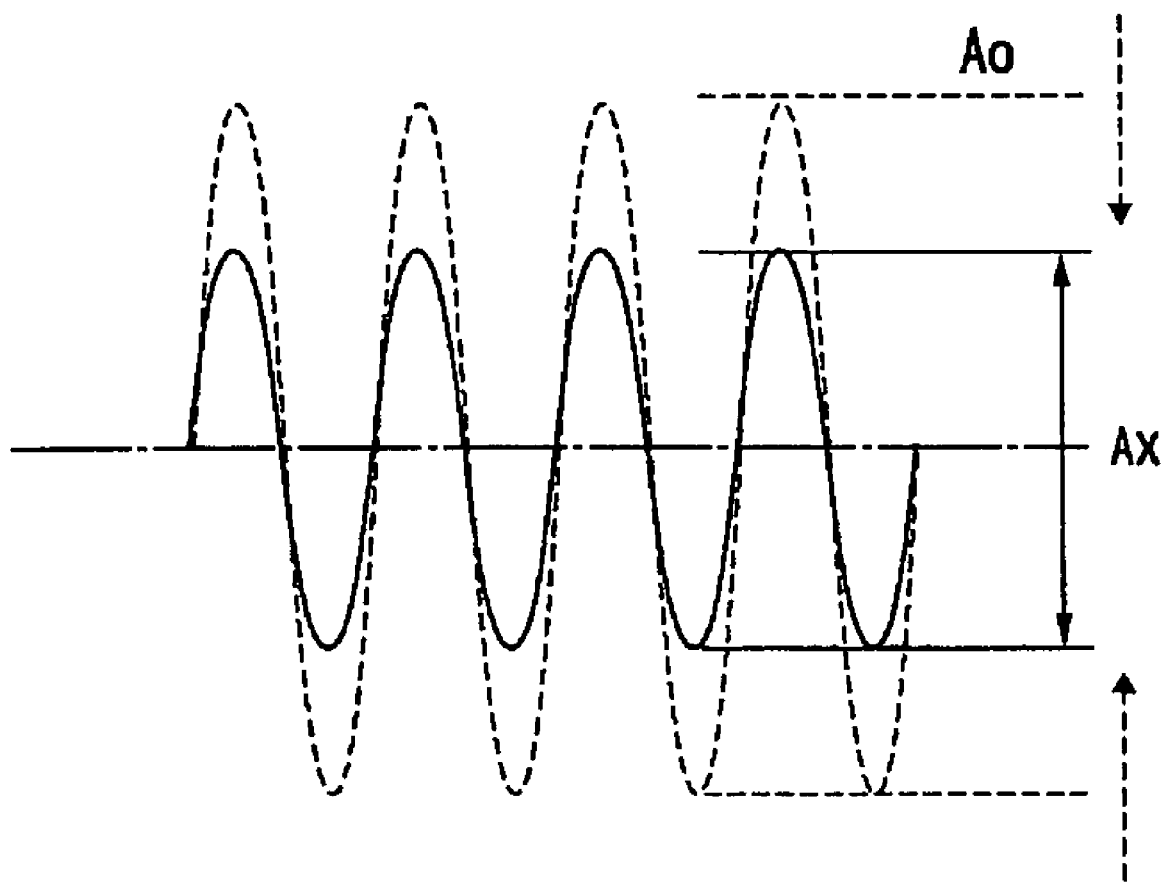
FIG. 12 is a chart showing variation in the detection signal when the force sensor comes into contact with the workpiece.
Figure 13:
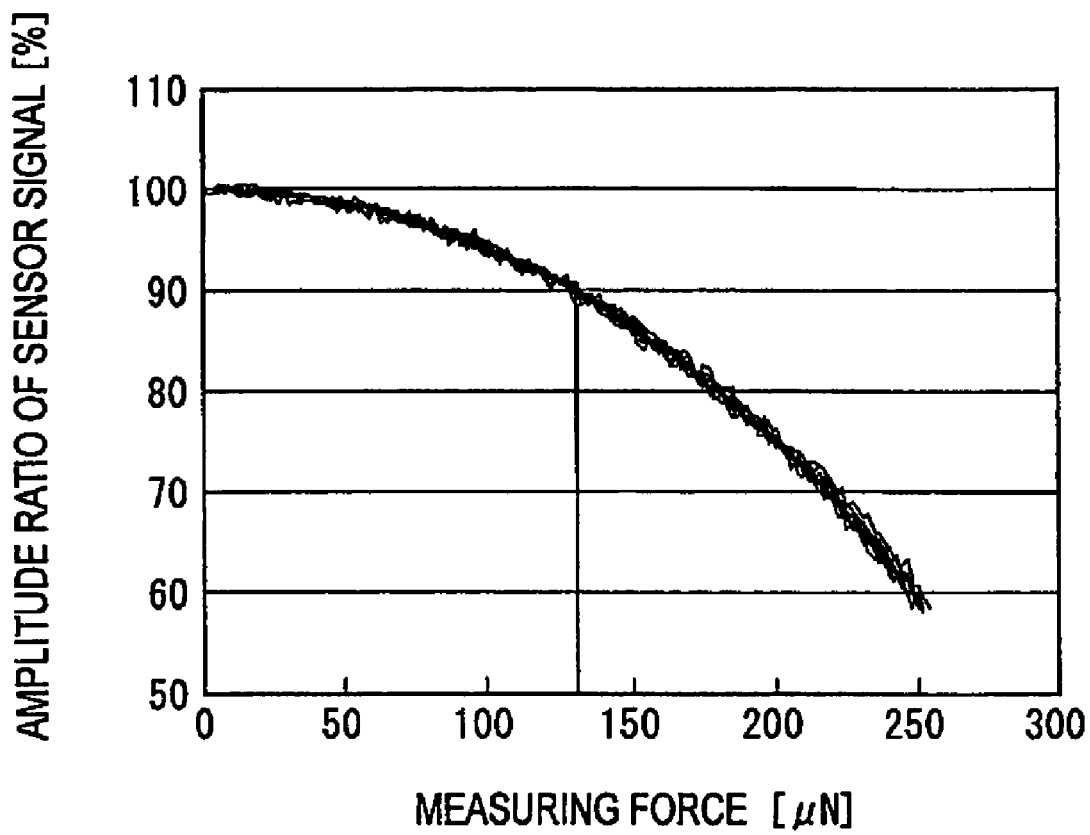
FIG. 13 is a graph showing a relationship between an attenuation rate of the detection signal and a measuring force of the force sensor.

FIG. 1 is a schematic illustration showing an outline of a contact-type scanning probe system according to an embodiment of the present invention FIG. 2 is a perspective view showing an arrangement of a probe. FIG. 3 is a conceptual diagram showing how the workpiece is scanned FIG. 4 is a perspective view showing arrangements of a body fixing portion and a sensor module. FIG. 5 is a cross section showing the arrangements of the body fixing portion and the sensor module. FIG. 6 is a front view showing an arrangement of a body connector. FIG. 7 is a cross section taken along the line VII-VII in FIG. 6. FIG. 8 is a cross section showing how a body-side substrate and a connector-side substrate are electrically coupled to each other. FIG. 9 is a rear perspective view showing an arrangement of a sensor module.

As shown in FIG. 1, the contact-type scanning probe system 10 includes a probe 20, and a controller 30 as a controlling section that controls the probe 20.

As shown in FIGS. 1 and 2, the probe 20 includes a casing 21 having a substantially rectangular parallelepiped shape, a module-fixing screw 100 (a fixing member), a probe body 200, a sensor module 300 that has a force sensor 1 and is detachably positioned and fixed to the probe body 200 by the module-fixing screw 100, an actuator 22 (relative moving section) that holds and advances/retracts the probe body 200 relative to a workpiece W, a scale 23 attached to the probe body 200, a scale detector 24 (a position detector) that detects based on the scale 23 a displacement amount of a force sensor 1 that is displaced by the actuator 22 (i.e., measuring position information of the workpiece detected by the force sensor 1).

The probe body 200 is provided to the probe 20 with a portion thereof housed in the casing 21.

The actuator 22, the scale 23 and the scale detector 24 are housed in the casing 21.

The module-fixing screw 100, the probe body 200 and the sensor module 300 will be described later in more detail.

The controller 30 includes: an oscillator 31 that applies a vibration signal to the force sensor 1 to vibrate the force sensor 1; an A/D conversion circuit 32 that converts an analogue detection signal from the force sensor 1 to a digital signal; a counter 33 that counts a signal from the scale detector 24 and outputs the measuring position information of the force sensor 1 as a position measured value; a processing unit 34 that calculates a deviation between the output from the A/D conversion circuit 32 (force fed-back signal) and a target measuring force; a force control compensator 35 that receives an output from the processing unit 34; a time differentiating circuit 36 that differentiates a position signal from the counter 33 to convert the position signal to a speed signal; a processing unit 38 that calculates a deviation between an output from the time differentiating circuit 36 and an output from the force control compensator 35 that is received via a switch 37; a speed compensator 39 that receives an output from the processing unit 38; a drive amplifier 40 that drives the actuator 22 based on an output from the speed compensator 39; a processing unit 41 that calculates a deviation between a measured value (position information) of the counter 33 and the target position; and a position control compensator 42 that receives an output from the processing unit 41 and applies the received output to the processing unit 38 via the switch 37.

When the contact-type scanning probe system 10 described above performs a constant-force scanning, the probe 20 is first brought close to the workpiece W under a position control. When the probe 20 comes into contact with the workpiece W, the control is switched to a constant-force scanning control. Then, by moving the probe 20 or the workpiece W, a contour of the workpiece is scanned under the constant-force scanning control. During the scanning, a position of the probe 20 or a position of the workpiece W is read as a contour measuring position.

Owing to the control as described above, the contour of the workpiece W can be measured with a constant measuring force as shown in FIG. 3.

Now, the module-fixing screw 100, the probe body 200 and the sensor module 300 will be described in detail.

As shown in FIGS. 2, 4 and 5, the module-fixing screw 100 includes a male screw 110 (rod-like portion), a cylindrical screw-slidable-contact portion 120 (a fixing projection) that is provided on one end of the male screw 110 and has a diameter larger than that of the male screw 110, a cylindrical knob 130 that is provided on one end of the screw-slidable-contact portion 120 and has a diameter larger than that of the screw-slidable-contact portion 120. In short, the screw-slidable-contact portion 120 is projected from a lateral surface of the male screw 110 and continuously formed in a circumferential direction of the male screw 11.

As shown in FIGS. 1, 2 and 4, the probe body 200 includes a substantially columnar body-held portion 210 with an end held by the actuator 22 and a body fixing portion 220 that is provided on the other end of the body-held portion 210, the body fixing portion 220 allowing the sensor module 300 to be detachably positioned and fixed thereto.

The body fixing portion 220 includes: an upper attachment portion 230 having a substantially hollow quadrangular prism shape; a lower attachment portion 240 having a substantially U-shape cross section that is integrated with one opening side of the upper attachment portion 230; a middle closing portion 250 (a second positioning portion) provided so as to close the opening on the lower attachment portion 240 side of the upper attachment portion 230 (see FIG. 5); and a body connector 260 having a rectangular block shape that is fitted in a space defined by the lower attachment portion 240 and the middle closing portion 250.

A connecting portion (not shown) of the body-held portion 210 is fixedly fitted in an opening on a side not provided with the lower attachment portion 240 in the upper attachment portion 230.

As shown in FIG. 5, the middle closing portion 250 includes a closing planar portion 251 as an upright planar portion. The middle closing portion 250 is formed such that an angle defined by the closing planar portion 251 and a connector front portion 261A of the body connector 260 is approximately 90°.

As shown in FIGS. 4 to 8, the body connector 260 includes a connector base 261 having a rectangular block shape, a connector cylindrical portion 262 (not shown in FIG. 5) provided to the connector base 261, connector pins 263 (a body-connecting portion) (not shown in FIG. 5) provided to the connector-cylindrical portion 262 and a body-side substrate 264 provided to the connector base 261.

The connector base 261 includes a connector-fit hole 261C on one end in the longitudinal direction, the connector-fit hole 261C communicating the connector front portion 261A (a first positioning portion) and a connector rear portion 261B. The connector base 261 includes a female thread 261D (an engaging hole) on the other end in the longitudinal direction, into which the male screw 110 of the module-fixing screw 100 is screwed. As shown in FIG. 5, the female thread 261D is so arranged that the diameter is R1 and a distance between an end thereof on the closing planar portion 251 side and the closing planar portion 251 is L1.

The connector cylindrical portion 262 having a cylindrical shape is fixedly fitted in the connector-fit hole 261C. The connector cylindrical portion 262 includes six pin-fit holes 262A that communicate two parallel surfaces of the connector cylindrical portion 262. The pin-fit holes 262A are provided at a uniform interval along a circumferential direction of the connector cylindrical portion 262.

The connector pins 263 each include a cylindrical pin base 263A fixedly fitted in the pin-fit hole 262A, an advancement/retraction abutting portion 263B provided to one end of the pin base 263A so as to be advanceable/retractable in the axial direction of the pin base 263A and a pin-projecting portion 263C that projects from the other end of the pin base 263A.

The advancement/retraction abutting portion 264B is formed of a conductive material into a domy shape that closes an opening on the one end of the pin base 263A.

The pin-projecting portions 263C are each formed of a conductive material and electrically coupled to the advancement/retraction abutting portion 263B via a conductive member (not shown) such as a conducting wire.

The body-side substrate 264 closes the connector-fit hole 261C but does not close the female thread 261D. The body-side substrate 264 includes substrate holes 264A in which the pin-projecting portions 263C and ends of the pin bases 263A are fixedly fitted.

The body-side substrate 264 electrically connects the advancement/retraction abutting portion 263B of the connector pin 263 to the controller 30.

As shown in FIGS. 2, 4, 5 and 9, the sensor module 300 includes: a module base 310 to which the force sensor 1 is attached, the module base 310 fixed to the body connector 260 by the module-fixing screw 100; a connector-side substrate 350 (a module-connecting portion) provided to the module base 310; a sensor-side substrate 360 provided to the module base 310; an IC chip 370 (a storage section) provide to the sensor-side substrate 360; and a cylindrical protection cover 380 that covers a portion of the module base 310.

The module base 310 includes a module connector 320 having a U-shape in cross section, a semi-cylindrical sensor attachment portion 330 provided on one end of the module connector 320 and a module closing portion 340 that closes an opening on the module connector 320 side of the sensor attachment portion 330.

The other end of the module connector 320, the end not provided with the sensor attachment portion 330, is formed to be a planar surface, the other end defining a pressing portion 321 that is pressed against the closing planar portion 251 when the sensor module 300 is attached to the probe body 200.

An opening end of the U-shape cross section of the module connector 320 is formed to be a planar surface that is parallel to an opening plane of the U-shape cross section, the opening end defining a slidable-contact portion 322 that slidably contacts with the connector front portion 261A when the sensor module 300 is attached to the probe body 200.

Provided on one end side of the module connector 320 is a screw-hole forming portion 323 that has a quadrangular plate shape protruding toward a side opposite to the opening side of the U-shape cross section. An end in the protruding direction of the screw-hole forming portion 323 defines a screw-hole-forming-portion end surface 324 that is a planar surface parallel to the slidable-contact portion 322. An insertion hole 325 extends through the screw-hole forming portion 323 from the screw-hole-forming-portion end surface 324 to the slidable-contact portion 322 side, into which the male screw 110 of the module-fixing screw 100 is inserted.

The insertion hole 325 has a uniform diameter portion 325A that in formed from the slidable-contact portion 322 side to a middle part in the axial direction with a uniform diameter and a widened portion 325B (an inclined portion) that is widened from the middle part in the axial direction toward the screw-hole-forming-portion end surface 324.

The uniform diameter portion 325A has a diameter R2 larger than the diameter R1. The uniform diameter portion 325A is formed such that the central axis C2 thereof is eccentric to the central axis C1 of the female thread 261D and a distance between the end thereof on the pressing portion 321 side and the pressing portion 321 is L1.

The insertion hole 325 has an inclined shape in which a distance between an opening end on the pressing portion 321 side and the pressing portion 321 gradually becomes larger toward the slidable-contact portion 322 side, the opening end positioned on a side opposite to the slidable-contact portion 322. The insertion hole 325 has a diameter larger than that of the male screw 110. Further, the insertion hole 325 is formed such that a distance between an end on the slidable-contact portion 322 side of the widened portion 325B and the pressing portion 321 is equal to a distance between the end on the closing planar portion 251 side and the closing planar portion 251.

As shown in FIG. 9, the force sensor 1 is attached to the sensor attachment portion 330 at a position close to an end on a side not provided with the module connector 320, the force sensor 1 attached in such a manner that the stylus 3 is protruded from a hole (not shown) of the protection cover 380.

The connector-side substrate 350 includes a substrate insertion hole 351 into which the male screw 110 of the module-fixing screw 100 is inserted. The connector-side substrate 350 is fixedly fitted in an internal space of the U-shape cross section of the module connector 320. As shown in FIG. 8, when the sensor module 300 is attached to the probe body 200, the connector-side substrate 350 moves the advancement/retraction abutting portion 263B of the connector pin 263 toward the pin-projecting portion 263C, where the connector-side substrate 350 is electrically coupled to the body-side substrate 264 via the advancement/retraction abutting portion 263B.

The sensor-side substrate 360 is fitted in a semi-cylindrical internal space of the sensor attachment portion 330. The sensor-side substrate 360 is electrically coupled to the connector-side substrate 350, the IC chip 370 and the force sensor 1. The sensor-side substrate 360 electrically connects the IC chip 370 and the force sensor 1 to the controller 30 via the connector-side substrate 350, the connector pin 263 and the body-side substrate 264.

The IC chip 370 stores specific property information about properties specific to the force sensor 1 such as a compensation value. The specific property information is read by the controller 30 and used in drive control of the actuator 22.

[Replacement Operation of Sensor Module]

Now, a replacement operation of the sensor module 300 will be described.

When a sensor module 300 is, for instance, broken, an operator detaches the broken sensor module 300 from the probe body 200. As shown in FIG. 5, a new sensor module 300 is positioned in such a manner that the pressing portion 321 is positioned collinearly with the closing planar portion 251. Then, the sensor module 300 is moved toward the probe body 200 to bring the slidable-contact portion 322 into contact with the connector front portion 261A. In this state, the end on the pressing portion 321 side of the uniform diameter portion 325A in the insertion hole 325 is positioned collinearly with the end on the closing planar portion 251 side of the female thread 261D.

Next, the module-fixing screw 100 is inserted into the insertion hole 325 so that the male screw 110 is screwed into the female thread 261D. By rotating the module-fixing screw 100, the screw-slidable-contact portion 120 is brought into contact with a contact point G of the widened portion 325B.

Then, by further rotating the module-fixing screw 100 and pressing the screw-slidable-contact portion 120 against the widened portion 325B, the sensor module 300 slidably contacts with the connector front portion 261A to press the closing planar portion 251 against the pressing portion 321. Accordingly, the sensor module 300 is positioned in the plane direction of the connector front portion 261A.

When the widened portion 325B is pressed toward the connector front portion 261A by the screw-slidable-contact portion 120, the sensor module 300 is positioned in a direction orthogonal to the plane direction of the connector front portion 261A.

In addition, when the sensor module 300 is positioned and fixed to the probe body 200, the advancement/retraction abutting portion 263B is pressed by the connector-side substrate as shown in FIG. 8, whereby the IC chip 370 and the force sensor 1 are electrically coupled to the controller 30.

Accordingly, the replacement operation of the sensor module 300 is completed.

Advantage of Embodiment

According to the embodiment above, the following advantages can be attained.

(1) The module-fixing screw 100 of the probe 20 includes the male screw 110 and the screw-slidable-contact portion 120 provided to the male screw 110. The probe body 200 held by the actuator 22 includes the connector front portion 261A, the middle closing portion 250 formed upright on the connector front portion 261A and the female thread 261D provided to the connector front portion 261A. The sensor module 300 to which the force sensor 1 is attached includes the slidable-contact portion 322 that slidably contacts with the connector front portion 261A, the pressing portion 321 pressed against the middle closing portion 250 and the insertion hole 325 that communicates the slidable-contact portion 322 side and the screw-hole-forming-portion end surface 324. The insertion hole 325 has the widened portion 325B that is inclined in such a manner that the distance between the opening end on the pressing portion 324 side and the pressing portion 321 gradually becomes larger toward the slidable-contact portion 322 side. The insertion hole 325 has a diameter larger than that of the male screw 110.

With the arrangement, the sensor module 300 can be positioned and fixed to the probe body 200.

Specifically, the sensor module 300 is positioned such that the slidable-contact portion 322 faces the connector front portion 261A and the pressing portion 321 faces the closing planar portion 251. The module-fixing screw 100 is inserted into the insertion hole 325 with the screw-slidable-contact portion 120 slidably contacting with the widened portion 325B to screw the male screw 110 into the female thread 261D, so that the sensor module 300 can be positioned and fixed to the probe body 200.

At this time, by moving the screw-slidable-contact portion 120 in the axial direction of the insertion hole 325 in a manner continuously abutting on the widened portion 325B, the pressing portion 321 can be pressed against the middle closing portion 250 while the sensor module 300 slidably contacts with the connector front portion 261A. Accordingly, the sensor module 300 can be highly reproducibly positioned in the plane direction of the connector front portion 261A.

The male screw 110 can be screwed into the female thread 261D with the widened portion 325B pressed toward the connector front portion 261A by the screw-slidable-contact portion 120. Accordingly, the sensor module 300 can be highly reproducibly positioned in a direction substantially orthogonal to the plane direction of the connector front portion 261A.

Since only the module-fixing screw 100 is required for positioning the sensor module 300 to the probe body 200, the arrangement can be simplified and work efficiency of the positioning can be enhanced.

Therefore, the force sensor 1 can be positioned easily and highly reproducibly with such a simple arrangement.

(2) The vibrating force sensor 1 including the stylus 3, the vibrating element 4 and the detecting element 5 is employed as the force sensor of the present invention.

With the arrangement, the positioning of the vibrating force sensor 1, which can perform highly accurate measurement with a small measuring force, can be realized easily and highly reproducibly with a simple arrangement, thus providing the probe 20 capable of performing measurement with even higher accuracy.

(3) The female thread 261D is employed as the engaging hole of the present invention and the male screw 110 is employed as the rod-like portion of the present invention.

Accordingly, with a simple arrangement that only requires screwing the male screw 110 into the female thread 261D, the sensor module 300 can be positioned and fixed to the probe body 200, thereby realizing the positioning of the force sensor 1 even more easily.

(4) The screw-slidable-contact portion 120 is provided continuously in the circumferential direction of the male screw 110.

With the arrangement, the male screw 110 can be screwed into the female thread 261D with the screw-slidable-contact portion 120 constantly abutting on the widened portion 325B, so that the force sensor 1 can be positioned even more easily.

(5) The insertion hole 325 is formed such that the distance between the end on the slidable-contact portion 322 side of the widened portion 325B and the pressing portion 321 is equal to the distance between the end on the middle closing portion 250 side of the female thread 261D and the middle closing portion 250.

With the arrangement, when the pressing portion 321 is pressed against the middle closing portion 250, the end on the slidable-contact portion 322 side of the widened portion 325B and the end on the middle closing portion 250 side of the female thread 261D can be positioned collinearly with each other, which allows the male screw 110 to substantially abut on the end on the slidable-contact portion 322 side of the widened portion 325B when engaged with the female thread 261D. Accordingly, the screw-slidable-contact portion 120 can be brought into contact with the widened portion 325B with the minimized projection amount of the screw-slidable-contact portion 120 from the male screw 110, which contributes to weight reduction of the module-fixing screw 100 and measurement with higher accuracy.

(6) The connector front portion 261A of the probe body 200 is provided with the connector pin 263 that is electrically coupled to the controller 30. In addition, the slidable-contact portion 322 side of the sensor module 300 is provided with the connector-side substrate 350 that is abuttable on the connector pin 263 and electrically coupled to the force sensor 1.

With the arrangement, by bringing the connector pin 263 and the connector-side substrate 350 into contact with each other when the sensor module 300 is positioned to the probe body 200, the controller 30 and the force sensor 1 can be coupled in a signal-communicable manner.

Accordingly, the replacement of the sensor module 300 can be performed even more easily.

(7) The connector pin 263 includes the advancement/retraction abutting portion 263B that is advanceable/retractable in the direction orthogonal to the connector front portion 261A.

With the arrangement, the connector pin 263 and the connector-side substrate 350 can be contacted with each other with a substantially uniform pressure regardless of shapes of abutment portions of the connector pin 263 and the connector-side substrate 350. Accordingly, the connector pin 263 and the connector-side substrate 350 do not have to be precisely designed or produced, so that productivity can be enhanced.

(8) The advancement/retraction abutting portion 263B has a domy shape in which a portion abutting on the connector-side substrate 350 is spherical.

With the arrangement, the connector pin 263 and the connector-side substrate 350 can point-contact with each other, which can reduce a friction resistance in moving the sensor module 300 toward the middle closing portion 250 in a manner slidably contacting with the connector front portion 261A.

Accordingly, the positioning of the force sensor 1 can be performed even more easily.

(9) The sensor module 300 includes the IC chip 370 that is electrically coupled to the connector-side substrate 350 and adapted to readably store the specific property information about a property specific to the force sensor 1.

With the arrangement, when the sensor module 300 is positioned and fixed to the probe body 200, the controller 30 reads and recognizes the specific property information stored in the IC chip 370, so that the controller 30 can control the actuator 22 in accordance with the force sensor 1.

Accordingly, adjustments specific to the force sensor 1 such as gain adjustment and frequency adjustment can be facilitated, thereby easily expanding the use.

(10) The contact-type scanning probe system 10 includes the probe 20 as described above and the controller 30 that reads the specific property information from the IC chip 370, brings a contact point of the stylus 3 into contact with a contour of a workpiece under a control corresponding to the property specific to the force sensor 1 based on the specific property information, drives the actuator 22 such that the detection signal from the force sensor 1 becomes equal to a preset value to obtain the measuring position information from the scale detector 24 and measure the contour of the workpiece from the measuring position information.

Accordingly, the contact-type scanning probe system 10 capable of attaining the advantages (1) and (9) can be provided.

Modification of Embodiment

The present invention is not limited to the embodiment above but includes the following modifications as long as an object of the present invention can be achieved.

Although the force sensor 1 is formed by the base 2 and the stylus 3 that are integrated in the embodiment above, the force sensor 1 may alternatively be formed by separate components. Specifically, the base 2 and the stylus 3 may be individually prepared, where the stylus 3 is fixedly bonded to the base 2. Although the stylus 3 is adapted to vibrate in the axial direction in the embodiment above, the stylus 3 may vibrate in a direction orthogonal to the axis thereof.

Although the vibrating force sensor 1 is used in the embodiment above, the arrangement is not limited thereto. Another sensor may be employed as long as the sensor detects a measuring force generated when contacting with the workpiece and outputs the measuring force as a force detection signal.

The rod-like portion of the present invention may be a rod-like member that has an elastically deformable end and a projection projecting from a lateral surface of the end, while the engaging hole of the present invention may be an engaging portion that allows the rod-like member to be inserted thereinto and the projection to be engaged therewith. Alternatively, the rod-like portion of the present invention may be a rod-like member having a cylindrical or a quadrangular prism shape, while the engaging hole of the present invention may be an engaging portion that allows the rod-like member to be inserted thereinto and tightens the rod-like member with its elasticity.

The screw-slidable-contact portion 120 may be provided intermittently along the circumferential direction of the male screw 110 or may be provided at a portion of the circumference.

The central axis C1 of the female thread 261D may be concentric with the central axis C2 of the insertion hole 325. In other words, the distance between the end on the middle closing portion 250 side of the female thread 261D and the middle closing portion 250 is larger than the distance between the end on the slidable-contact portion 322 side of the widened portion 325B and the pressing portion 321.

The probe body 200 may not be provided with the connector pin 263 and the sensor module 300 may not be provided with the connector-side substrate 350, where the controller 30 and the force sensor 1 is connected to each other with a conducting member such as a conducting wire.

The connector pin 263 may not be provided with the advancement/retraction abutting portion 263B, where a tip end of the pin base 263A abuts on the connector-side substrate 350.

The advancement/retraction abutting portion 263B may be cylindrical with an end thereof closed instead of the domy shape.

The sensor module 300 may not be provided with the IC chip 370, where the controller 30 reads the specific property information about a property specific to the force sensor 1. Alternatively, a drive that drives and reads a recording medium such as an optical disc and a magnetic disc storing the specific property information may be provided or an input section such as a keyboard through which the specific property information can be input and set may be provided.

The insertion hole 325 may be so arranged that only the pressing portion 321 side thereof is provided with the widened portion 325B and the other portion is not inclined such that the distance from the pressing portion 321 gradually becomes larger toward the slidable-contact portion 322 side.

The priority application Number JP 2006-136878 upon which this patent application is based is hereby incorporated by reference.

What is claimed is:

1. A probe, comprising:
   a force sensor that detects a measuring force generated when the probe contacts with a workpiece and outputs the measuring force as a force detection signal;
   a position detector that detects a measuring position of the workpiece detected by the force sensor and outputs the measuring position as measuring position information;
   a relative moving section that relatively moves the force sensor and the workpiece;
   a probe body that is held by the relative moving section;
   a sensor module to which the force sensor is attached; and
   a fixing member that is inserted to the sensor module and the probe body, the fixing member detachably positioning and fixing the sensor module to the probe body, wherein
   the probe body includes a substantially planar first positioning portion, a second positioning portion that is formed upright on the first positioning portion and an engaging hole that is provided to the first positioning portion, the engaging hole allowing the fixing member to be inserted thereinto and engaged therewith in a detachable manner,
   the sensor module includes a slidable-contact portion that slidably contacts with the first positioning portion, a pressing portion that is pressed against the second positioning portion and an insertion hole that communicates a slidable-contact portion side and a side opposite to the slidable-contact portion side, the insertion hole allowing the fixing member inserted thereinto,
   the fixing member includes: a rod-like portion that is formed in a rod-like shape and inserted into the insertion hole, an end side of the rod-like portion engaged with the engaging hole; and a fixing projection that protrudes from a lateral surface of the other end side of the rod-like portion, and
   the insertion hole includes an inclined portion on which the fixing projection can abut, the inclined portion inclined such that a distance between a pressing portion side of an opening positioned opposite to the slidable-contact portion and the pressing portion becomes gradually larger toward the slid-contacting portion, the insertion hole having a diameter larger than that of the rod-like portion.

2. The probe according to claim 1, wherein the force sensor includes a stylus having a contact portion on a tip end thereof, a vibrating element that vibrates the stylus and a detecting element that detects a vibration state of the stylus and outputs the vibration state as a detection signal.

3. The probe according to claim 1, wherein
   the engaging hole is a female thread, and
   the rod-like portion is a male screw.

4. The probe according to claim 1, wherein the fixing projection is continuously provided along a circumferential direction of the rod-like portion.

5. The probe according to claim 1, wherein
   the insertion hole is formed such that a distance between an end on the slidable-contact portion side of the inclined portion and the pressing portion is substantially equal to a distance between an end on the second positioning portion side of the engaging hole and the second engagement portion.

6. The probe according to claim 1, wherein
   the probe body includes a body-connecting section that is provided on the first positioning portion and electrically coupled to a controlling section for controlling the relative moving section, and
   the sensor module includes a module-connecting portion that is provided at a position abuttable on the body-connecting portion in the slidable-contact portion side, the module-connecting portion electrically coupled to the force sensor and also electrically coupled to the body-connecting portion when the module-connecting portion abuts on the body-connecting portion.

7. The probe according to claim 6, wherein the body-connecting portion includes an advancement/retraction abutting portion that is advanceable/retractable in a direction intersecting with the first positioning portion, the module-connecting portion abutting on the advancement/retraction abutting portion.

8. The probe according to claim 6, wherein a portion adapted to abut on the module-connecting portion in the body-connecting portion is spherically formed.

9. The probe according to claim 6, wherein the sensor module includes a storage section that is electrically coupled to the module-connecting portion and adapted to readably store specific property information about a property specific to the force sensor.

10. A contour measuring instrument, comprising:
    a probe that includes: a force sensor that detects a measuring force generated when the probe contacts with a workpiece and outputs the measuring force as a force detection signal; a position detector that detects a measuring position of the workpiece detected by the force sensor and outputs the measuring position as measuring position information; a relative moving section that relatively moves the force sensor and the workpiece; and
    a controlling section that drives the relative moving mechanism to bring the contact portion on a tip end of the probe into contact with the workpiece in such a manner that the detection signal from the force sensor is equal to a preset value and reads the measuring position information from the position detector to measure a contour of the workpiece from the measuring position information, wherein
    the probe includes: a probe body that is held by the relative moving section; a sensor module to which the force sensor is attached; and a fixing member that is inserted to the sensor module and the probe body, the fixing member detachably positioning and fixing the sensor module to the probe body, the probe body includes: a substantially planar first positioning portion; a second positioning portion that is formed upright on the first positioning portion; and an engaging hole that is provided to the first positioning portion, the engaging hole allowing the fixing member to be inserted thereinto and engaged therewith in a detachable manner, the sensor module includes: a slidable-contact portion that slidably contacts with the first positioning portion; a pressing portion that is pressed against the second positioning portion; and an insertion hole that communicates a slidable-contact portion side and a side opposite to the slidable-contact portion side, the insertion hole allowing the fixing member inserted thereinto, the fixing member includes: a rod-like portion that is formed in a rod-like shape and inserted into the insertion hole, an end side of the rod-like portion engaged with the engaging hole; and a fixing projection that protrudes from a lateral surface of the other end side of the rod-like portion, and the insertion hole includes an inclined portion on which the fixing projection can abut, the inclined portion inclined such that a distance between a pressing portion side of an opening positioned opposite to the slidable-contact portion and the pressing portion becomes gradually larger toward the slid-contacting portion, the insertion hole having a diameter larger than that of the rod-like portion.

11. The contour measuring instrument according to claim 10, wherein the probe body includes a body-connecting section that is provided on the first positioning portion and electrically coupled to a controlling section for controlling the relative moving section, the sensor module includes: a module-connecting portion that is provided at a position abuttable on the body-connecting portion in the slidable-contact portion side, the module-connecting portion electrically coupled to the force sensor and also electrically coupled to the body-connecting portion when the module-connecting portion abuts on the body-connecting portion; and a storage section that is electrically coupled to the module-connecting portion, the storage section readably storing specific property information about a property specific to the force sensor, and the controlling section reads the specific property information from the storage section and brings the contact portion on the tip end of the probe into contact with the workpiece under a control corresponding to the property specific to the force sensor based on the specific property information.

* * * * *